No. 791,820. PATENTED JUNE 6, 1905.
C. SATTLER.
COASTING SLED.
APPLICATION FILED SEPT. 6, 1904.
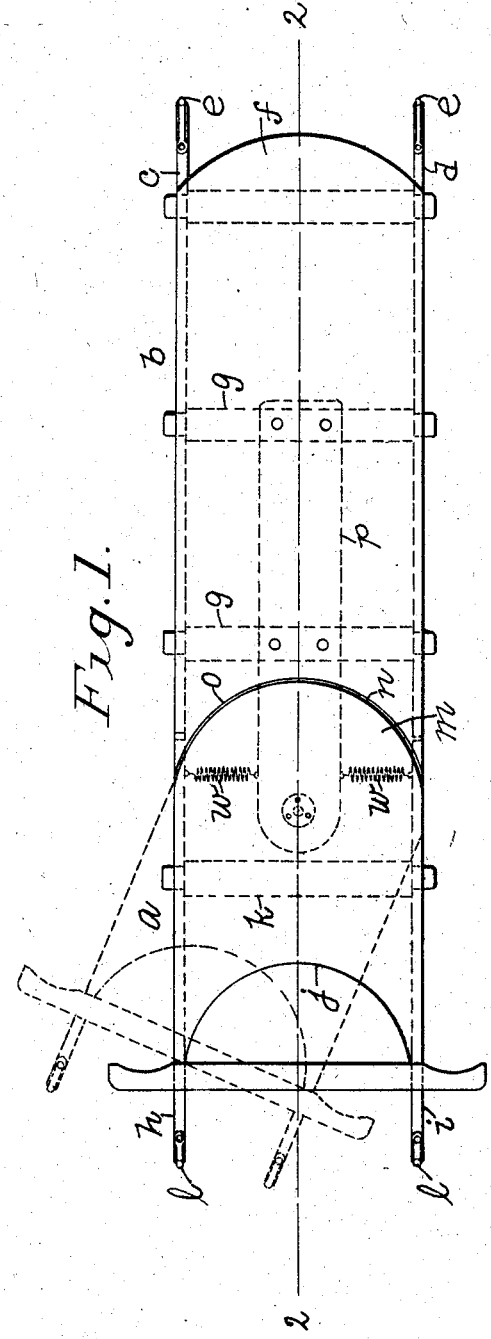
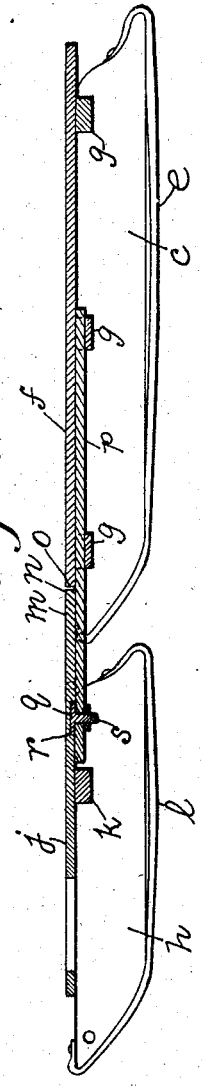
WITNESSES:
C. H. Gannett
J. Murphy
INVENTOR.
Charles Sattler
BY
Jas. H. Churchill
ATTORNEY.

No. 791,820.

Patented June 6, 1905.

UNITED STATES PATENT OFFICE.

CHARLES SATTLER, OF CHELSEA, MASSACHUSETTS.

COASTING-SLED.

SPECIFICATION forming part of Letters Patent No. 791,820, dated June 6, 1905.

Application filed September 6, 1904. Serial No. 223,335.

*To all whom it may concern:*

Be it known that I, CHARLES SATTLER, a citizen of the United States, residing in Chelsea, in the county of Suffolk and State of Massachusetts, have invented an Improvement in Coasting-Sleds, of which the following description, in connection with the accompanying drawings, is a specification, like letters on the drawings representing like parts.

This invention relates to a coasting-sled, and has for its object to provide a sled of the class referred to which can be used as a double sled or runner or as two individual sleds, as desired. For this purpose I employ two sleds, each complete in itself and comprising side bars having runners and a top piece and construct the top pieces of said sleds so that they may coöperate to form a continuous top piece for both sleds when the latter are connected together to form a double sled or runner and so that the front sled may be turned freely to the right or left to guide the double sled or runner in either direction. Provision is made for pivotally connecting the front sled to the rear sled in such manner as will not interfere with the upper surface of either sled, so that when the said sleds are coupled together the top pieces of both sleds may be utilized and when disconnected the top piece of each sled is left smooth and can be utilized. Provision is also made for automatically keeping the front sled in alinement with the rear sled when lateral pressure or force employed for turning the front sled is removed therefrom. These and other features of this invention will be pointed out in the claims at the end of this specification.

Figure 1 is a plan view of a double sled or runner embodying this invention, the front sled being shown in a full-line and dotted-line position; and Fig. 2, a longitudinal section of the double sled or runner shown in Fig. 1, the section being taken on the line 2 2, Fig. 1.

Referring to the drawings, $a$ represents the front and $b$ the rear sled of a double runner or sled embodying this invention. The rear sled $b$ may in general be of any suitable construction and comprises the side bars $c\,d$, provided with the runners $e$, and the top board or piece $f$, the side bars being connected by suitable cross-braces $g$. The front sled $a$ may in general be of any suitable construction and comprises the side bars $h\,i$ and top piece $j$, the side bars $h\,i$ being connected by the cross-piece $k$ and provided with runners $l$.

In accordance with this invention the top piece $j$ of the front sled is provided with a rearwardly-projecting portion $m$, having a convexed outer edge $n$, which coöperates with and extends into a concaved recess $o$ in the front portion of the top piece of the rear sled, so that when the said sleds are in alinement, as represented by full lines in Fig. 1, the top pieces $j\,f$ form a substantially continuous top piece, yet are separated, so that the top of the front sled can be turned at an angle to the top of the rear sled without materially breaking the continuity of the substantially continuous top piece of the double sled.

Provision is made for pivotally connecting the two sleds together, so that the full area of the top surface of each sled is preserved for seating purposes, and this result may be accomplished, as herein shown, by securing to the rear sled below its top piece a bar or board $p$, which extends longitudinally of said sled near its center and projects beyond the side bars or boards $c\,d$ thereof and is provided at or near its front end with a hole for the reception of a pivot-pin $q$, having a head $r$, which is fastened in any suitable manner to the under side of the top piece $j$ of the front sled, the pivot-pin being shown as provided with a hole $s$ for the reception of a suitable pin, (not shown,) by which the front sled is detachably secured to the board $p$, and thereby to the rear sled. Provision is also made for automatically returning the front sled to its normal position, represented by full lines in Fig. 1, and for this purpose the rear end of the side bars $h\,i$ of the front sled are connected by helical springs $w$ to the opposite sides of the board $p$.

From the above description it will be seen that when the two sleds are coupled together a double runner is formed, which has a substantially continuous top surface, and that when the sleds are disconnected, each is complete in itself, and the upper surface of the top piece of the front sled remains smooth and is capable of being utilized to its full capacity.

I claim—

1. In a coasting-sled, the combination with a rear sled provided with a top piece having a curved front portion, of a front sled provided with a top piece having a curved rear portion fitted into the curved front portion of the top piece of said rear sled, a board or bar rigidly secured to the rear sled below its top piece and projecting beyond the same, and a pivot-pin secured to the top piece of the front sled and projecting below the same to engage the said board or bar, substantially as described.

2. In a coasting-sled, the combination with a rear sled provided with a top piece having a curved front portion, of a front sled provided with a top piece having a curved rear portion fitted into the curved front portion of the top piece of said rear sled, a board or bar secured to the rear sled below its top piece and projecting beyond the same, a pivot-pin secured to the top piece of the front sled and projecting below the same to engage the said board or bar, and springs secured to said board and to the rear ends of the side bars of said front sled, substantially as described.

In testimony whereof I have signed my name to this specification in the presence of two subscribing witnesses.

CHARLES SATTLER.

Witnesses:
JAS. H. CHURCHILL,
J. MURPHY.